United States Patent [19]

Weissmueller

[11] 4,313,137
[45] Jan. 26, 1982

[54] INTEGRATABLE VERTICAL SYNC SEPARATOR

[75] Inventor: William R. Weissmueller, Wildwood, Ill.

[73] Assignee: Zenith Radio Corporation, Glenview, Ill.

[21] Appl. No.: 147,414

[22] Filed: May 6, 1980

[51] Int. Cl.³ .............................................. H04N 5/06
[52] U.S. Cl. .................................. 358/154; 358/148; 358/153
[58] Field of Search ................ 358/148, 153, 154, 158; 328/139

[56] References Cited

U.S. PATENT DOCUMENTS

| | | | |
|---|---|---|---|
| 3,527,888 | 9/1970 | Clapp | 358/154 |
| 4,185,299 | 1/1980 | Harford | 358/153 |
| 4,237,487 | 12/1980 | Ikeda | 358/154 |
| 4,238,769 | 12/1980 | Rzeszewski | 358/154 |

*Primary Examiner*—Michael A. Masinick
*Attorney, Agent, or Firm*—John H. Coult; John H. Moore

[57] ABSTRACT

An integratable vertical sync separator is described for use in a television receiver. The preferred embodiment includes an integrated capacitor which is charged and alternately discharged by current sources in response to composite sync pulses such that the capacitor develops a relatively high level voltage when vertical sync pulses are received. The voltage developed by the capacitor is sensed by a peak detector for developing a vertical sync output pulse and for producing a feedback signal indicative of the amplitude of the relatively high level voltage on the capacitor. The feedback signal is applied to the current sources which are conditioned to vary the charge and discharge rates of the capacitor for improved performance in sub-standard signal conditions.

14 Claims, 3 Drawing Figures

A

B

INTEGRATABLE VERTICAL SYNC SEPARATOR

BACKGROUND OF THE INVENTION

This invention is directed generally to improvements in television receivers, and is more specifically directed to an improved vertical sync separator for such a receiver.

Conventionally, television receivers receive a broadcast signal whose components include horizontal and vertical sync pulses in a train of pulses. Because the horizontal and vertical sync pulses are processed separately, the receiver includes a so-called "vertical sync separator" for separating the vertical sync pulses from the horizontal sync pulses.

To separate the vertical sync pulses from the train of pulses, it is conventional to apply the train of pulses to a second or third order low pass filter. The filter's output ideally consists of a signal representative of only the vertical sync pulses. That signal is peak detected to generate an output pulse for synchronizing the vertical scan of the receiver with the broadcast signal.

The practical problem with the conventional vertical sync separator is that it is not economical to include it in an integrated circuit because such a circuit would necessarily include at least two output pins from the circuit devoted only to the separator function. One pin is needed for access to the low pass filter and another pin is needed for access to a relatively large capacitor associated with the peak detector. Both the low pass filter and the peak detector typically require the use of capacitors whose size makes them impractical for integration. Hence, although much of the receiver's circuitry has been constructed in integrated circuit form, the vertical sync separator is one circuit which has impeded full integration of the receiver's signal processing circuits.

In contemplating the integration of a vertical sync separator, an important feature thereof is satisfactory performance under sub-standard signal conditions. High level impulse or thermal noise in the composite sync signal can cause loss of vertical synchronization in the receiver if the sync separator is overly sensitive to noise. This fact, of course, complicates the integration of the sync separator, but must be accounted for in any practical design.

OBJECTS OF THE INVENTION

It is a general object of the invention to provide an improved vertical sync separator for a television receiver.

It is a more specific object of the invention to provide a vertical sync separator which is particularly well suited for construction in integrated circuit form.

It is another object of the invention to provide such a separator which operates satisfactorily even under sub-standard signal conditions.

BRIEF DESCRIPTION OF THE FIGURES

The objects stated above and other objects of the invention are more particularly set forth in the following detailed description and in the accompanying drawings of which.

DESCRIPTION OF THE PREFERRED EMBODIMENT

Figure 1:
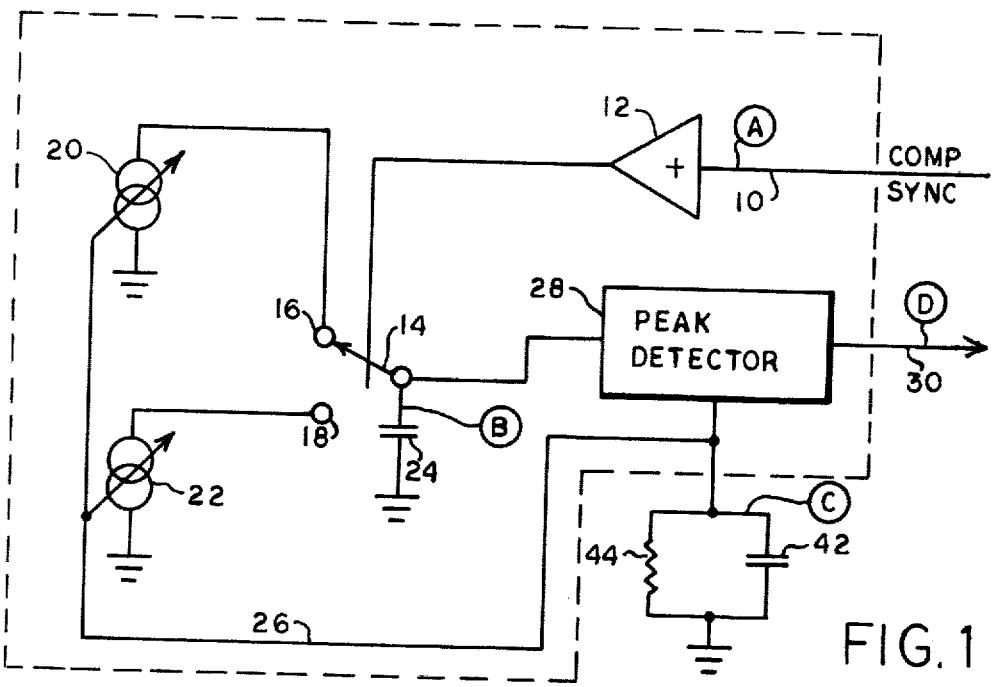
FIG. 1 is a highly schematic diagram of a vertical sync separator embodying various aspects of the invention.

Referring to FIG. 1, a highly schematic representation of an integratable vertical sync separator is shown which embodies various aspects of the invention. Those components of the separator which are intended to be integrated are included within the dashed lines. The remaining components may be constructed of discrete components.

The input to the separator comprises a composite sync signal which includes horizontal and vertical sync pulses. That composite signal may be applied via an input lead 10 to a conventional buffer amplifier 12. The composite sync signal appearing at the output of the amplifier 12 operates a switch 14 for making contact alternately with contact points 16 and 18. The switch 14, in combination with a source of charging current 20 and a source of discharging current 22, comprises means for alternately charging and discharging a storage capacitor 24 in response to the composite sync signal. As described in more detail below, the operation is such that the capacitor 24 becomes charged to develop a relatively high level voltage when vertical sync pulses are received, and a much smaller voltage when horizontal sync pulses are received.

To control the amplitude of the voltage developed on the capacitor 24, the current sources 20 and 22 are responsive to a feedback signal on a lead 26 for altering the charge and discharge rates of the capacitor 24 for improved performance under sub-standard signal conditions, as when the composite sync signal has a poor signal-to-noise ratio. In addition, the current sources 20 and 22 are also preferably responsive to the feedback signal for altering their charge rate/discharge rate ratio for improved performance under noisy signal conditions. For example, under certain conditions, the source 20 may charge the capacitor 24 at a rate four times greater than the capacitor is discharged by the source 22. Under other conditions, the source 20 may charge the capacitor 24 at a rate which is twelve times greater than the capacitor 24 is discharged by the source 22. Hence, the charge rate/discharge rate ratio of the capacitor 24 may be said to have been changed from 4:1 to 12:1.

The separator also includes a detector 28 which is responsive to the relatively high level voltage on the capacitor 24 for developing a vertical sync output pulse at lead 30, and for producing the feedback signal on the lead 26 for varying the charge and discharge rates, and preferably the charge rate/discharge rate ratio, effected by the current sources 20 and 22.

Figure 2:
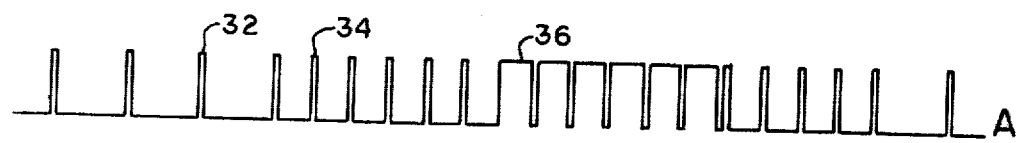
FIG. 2 shows various waveforms useful in describing the operation of the sync separator shown in FIG. 1.
Figure 2:
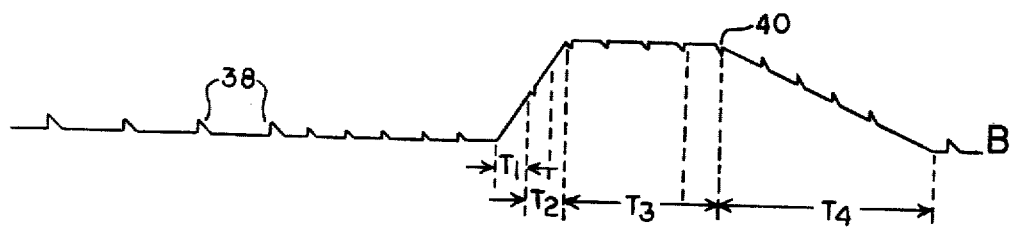
Figure 2:
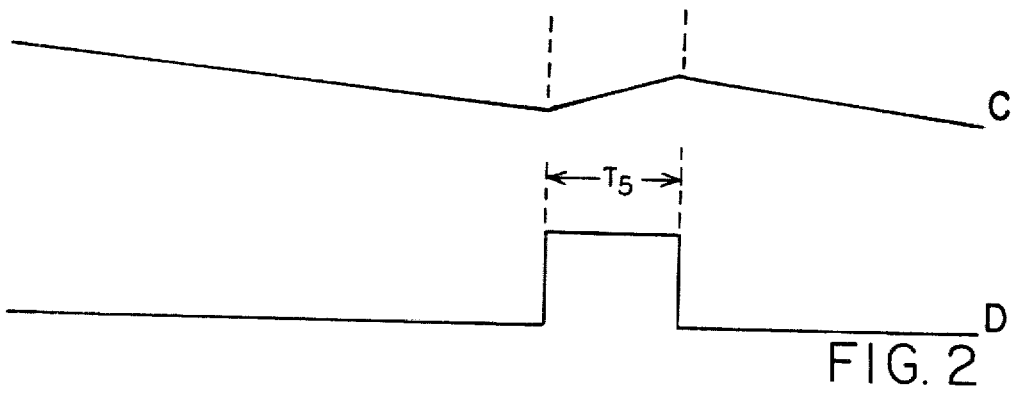

FIG. 2 illustrates exemplary waveforms A through D which will be used to describe the operation of the separator in more detail. The points in the circuitry of FIG. 1 are labeled with characters A through D to indicate where the corresponding waveforms appear.

Waveform A of FIG. 2 illustrates the composite sync signal which is applied to input lead 10 and, through the amplifier 12, to the switch 14. As shown, the composite sync signal includes horizontal sync pulses 32, equalization pulses 34, and vertical sync pulses 36. On the occurrence of each of the illustrated pulses, the switch 14 is caused to move into contact with contact point 16 so that the capacitor 24 is charged by the current source 20. At the end of each such pulse, the switch 14 moves into contact with the contact point 18 so that the capacitor is discharged by the current source 22. The cycle of charge followed by discharge continues for each pulse in the composite sync signal.

The resultant voltage developed on the capacitor 24 is represented by waveform B of FIG. 2. As shown by the small voltage pulses 38, the capacitor 24 becomes charged only to a very small extent upon the occurrence of a horizontal sync pulse or an equalization pulse. However, when the much wider vertical sync pulses occur, the switch 14 remains in contact with the contact point 16 for a correspondingly longer time. Consequently, the capacitor 24 becomes more fully charged and develops a relatively high level voltage pulse 40.

It will be noted from FIG. 2 that the capacitor 24 charges during an interval $T_1$, discharges slightly immediately thereafter due to the termination of the first horizontal sync pulse, and then charges again during the interval $T_2$. It is assumed that, immediately following the interval $T_2$, the charging current source 20 becomes saturated, wherefore the capacitor voltage remains at a substantially constant amplitude during the interval $T_3$.

Following the last vertical sync pulse, the capacitor 24 begins to discharge and during the interval $T_4$ may become nearly completely discharged. As is evident from waveform B of FIG. 2, the rate of discharge of the capacitor 24 is substantially less than the rate of charge in order to properly develop the capacitor voltage. Under strong signal conditions, the charge to discharge rate may be approximately 5:1.

Referring again to FIG. 1, the voltage on the capacitor 24 is coupled to the detector 28 which may be a conventional peak detector. Upon sensing the relatively high level voltage pulse developed on the capacitor 24 in response to vertical sync pulses, the detector 28 generates a vertical sync output pulse (waveform D) for use in synchronizing the vertical sweep of a television receiver with the broadcast signal from which the composite sync signal was obtained.

Associated with the detector 28 is a capacitor 42 whose value may be 0.04 microfarads, for example. This capacitor is charged by the detector substantially to the peak value of the voltage developed on the capacitor 24. A resistor 44 is coupled in parallel with the capacitor 42 to control the rate of discharge of the capacitor 42. The value of the resistor 44 may be about 2.2 megohms and is selected such that the capacitor 42 discharges sufficiently between successive vertical intervals so that the peak amplitude of the voltage pulse 40 (FIG. 2) on the capacitor 24 exceeds the voltage on the capacitor 42. Whenever that occurs, the detector 28 develops a vertical sync output pulse on the lead 30.

Waveform C of FIG. 2 illustrates the voltage on the capacitor 42. A comparison of waveforms B and C indicates that the capacitor 42 charges during the interval $T_5$ and discharges at all other times during ideal signal conditions. Waveform D of FIG. 2 shows that the vertical sync output pulse is initiated when the capacitor 42 begins charging.

In the illustrated embodiment, the voltage on the capacitor 42 is used as a feedback signal for controlling the current sources 20 and 22. As the amplitude of the feedback signal varies, the amplitudes of the charge and discharge currents also vary, thereby varying the charge and discharge rates of the capacitor 24.

Under strong signal conditions, the composite sync signal has a high signal to noise ratio and the feedback signal may be said to have a nominal value. Under poor signal conditions, as when substantial thermal noise is present in the composite sync signal, the amplitude of the feedback signal tends to decrease from its nominal value. In response to the latter change, the current sources 20 and 22 increase the charge and discharge rate of the capacitor 24, the effect of which is to hold more constant the amplitude of the high voltage pulse 40 on the capacitor 24. Conversely, increases from nominal in the amplitude of the feedback signal result in decreased charge and discharge rates. It can be seen therefore, that the vertical sync separator operates as a variable gain filter to separate vertical sync pulses from the composite sync signal in a negative feedback arrangement to compensate for the effects of noise in the composite sync signal.

It has also been found that improved noise performance is achieved if the charge rate/discharge rate ratio is varied under certain conditions, such variation occurring simultaneously with change in the charge and discharge rates. For example, it has been found that performance is improved by reducing the charge rate/discharge rate ratio when impulse noise is present in the composite sync signal. In the illustrated embodiment, impulse noise tends to raise the value of the feedback signal. The current sources 20 and 22 are conditioned to reduce the charge rate/discharge rate ratio of capacitor 24 when that occurs so that the capacitor discharges relatively faster, thereby minimizing the sensitivity of the capacitor voltage to impulse noise. A simultaneous reduction in the charge and discharge rates also preferably occurs when the charge rate/discharge rate ratio is reduced.

When thermal noise is present in the composite sync signal, the feedback signal of the illustrated embodiment tends to decrease from nominal. The current sources 20 and 22 are conditioned to respond to the reduction in the amplitude of the feedback signal by increasing the charge rate/discharge rate ratio of the capacitor 24. The capacitor 24, therefore, discharges relatively slower in the presence of thermal noise to increase the sensitivity of its voltage to vertical sync pulses. Preferably, the increase in the charge rate/discharge rate ratio is also accompanied by an increase in the charge and discharge rates.

It is thought that the charge rate/discharge rate ratio may be varied from about 4:1 for composite sync signals having a high signal-to-noise ratio to a charge rate/discharge rate ratio of about 12:1 for composite signals having a low or poor signal-to-noise ratio. The optimum rate of change of the charge rate/discharge rate ratio is, however, largely dependent on whatever noise processing circuitry exists upstream of the sync separator in a television receiver. Many noise processing circuits reduce the average duty cycle of the sync pulses as they remove noise. Increasing the charge to discharge ratio tends to compensate for this effect.

Because of the way in which the current sources 20 and 22 are employed to control the charge on the capacitor 24, that capacitor may be of a relatively small value which is readily integratable. Hence, the only input or output pin normally required for the separator function is for coupling the capacitor 42 to the peak detector 28. No extra input pin is required because a source of composite sync is ordinarily available from other signal processing circuits which are integrated on the same chip with the sync separator. Thus, the sync separator of FIG. 1 is readily adaptable for integration with other signal processing circuitry on a single integrated circuit chip. Only the capacitor 42 and its discharge resistor 44 are external to the chip.

Figure 3:
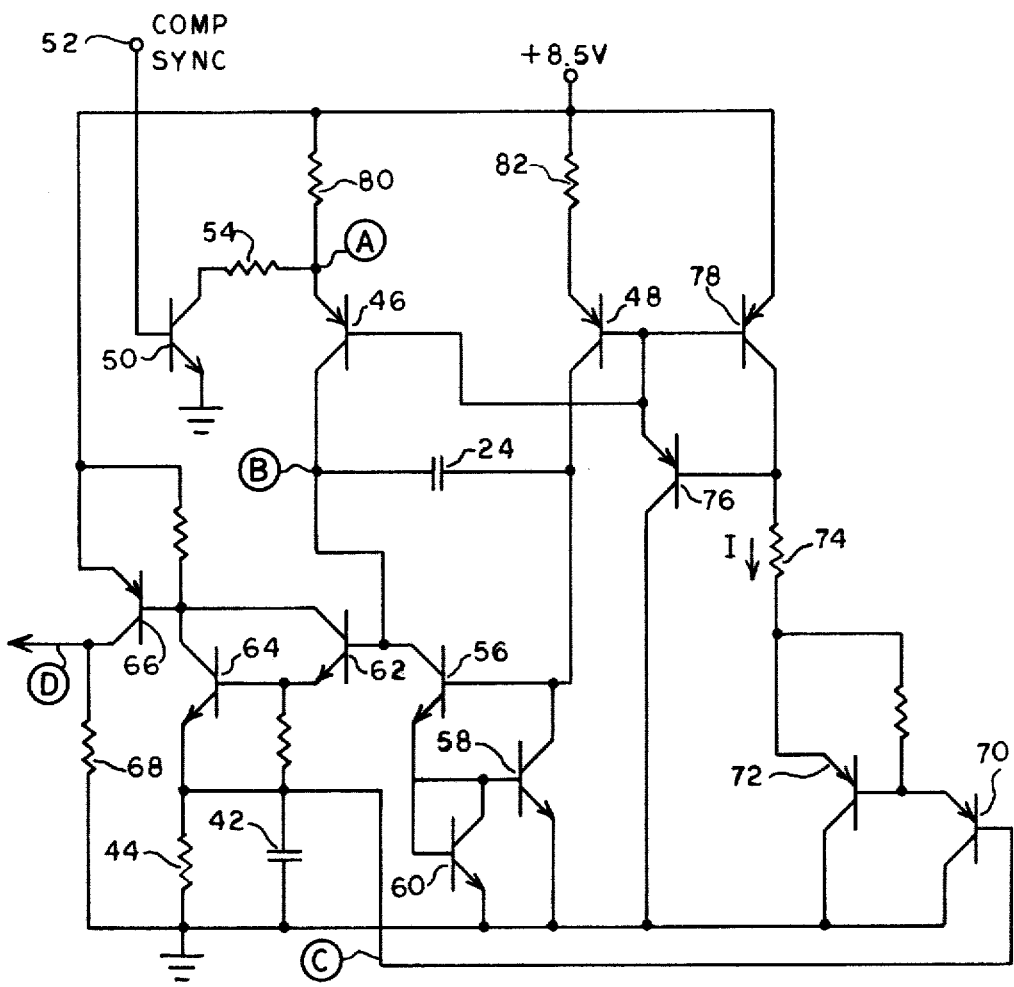
FIG. 3 is a detailed circuit diagram of a vertical sync separator of the type shown in FIG. 1.

Referring now to FIG. 3, a circuit diagram is shown of a preferred embodiment of a vertical sync separator which operates in accordance with the preceding description of FIG. 1. Components which have the same reference numerals in FIGS. 1 and 3 perform the same functions.

In the embodiment of FIG. 3, the function of the charging current source is provided by a transistor 46 and the function of the discharging current source is provided by a transistor 48. The collectors of transistors 46 and 48 are coupled as shown to opposite plates of the capacitor 24 for charging and discharging thereof.

The function of the switch 14 is provided by a transistor 50 which receives an inverted or negative-going composite sync signal at an input terminal 52. The collector of the transistor 50 is coupled through a resistor 54 to the emitter of the transistor 46. With this arrangement, positive going sync pulses turn on the transistor 50 and cause the base-emitter junction of the transistor 46 to be reversed biased. Negative going sync pulses turn off the transistor 50 and turn on the transistor 46. Hence, the transistor 46 is on whenever the composite sync signal, shown as waveform A in FIG. 2, is positive.

The discharging source, transistor 48, is maintained in an on condition at all times rather than being turned off and on. However, the charge and discharge effect on the capacitor 24 is essentially the same as shown in FIG. 1 with one exception. In FIG. 3, the collector currents of the transistor 46 and 48 are received by a current mirror established by transistors 56, 58 and 60 so as to multiply the effective capacitance of the capacitor 24 by a factor of two, and to invert the collector current of transistor 48 such that it discharges capacitor 24. This result is obtained because the transistors 56, 58 and 60 comprise a current mirror which causes the collector current of transistor 56 to be equal to the collector current of transistor 56 to be equal to the collector current of the transistor 58. In addition, with the transistor 46 turned on during sync pulses, the collector current of the transistor charges the capacitor 24 with a current proportional to the difference between the collector currents of transistors 46 and 48. Following a sync pulse, the capacitor 24 is discharged by one half the collector current associated with transistor 46. The net effect is that the voltage at point B in FIG. 3 is shown by waveform B of FIG. 2 and the effective capacitance of the capacitor 24 is increased by a factor of 2. With this arrangement, the capacitor 24 may have a value of 30 picofarads and its effective capacitance is raised to 60 picofarads.

The voltage at point B is coupled to a peak detector comprising transistors 62, 64 and 66. The emitters of transistors 62 and 64 are coupled to the capacitor 42 and the resistor 44 so that the capacitor 42 is charged by positive excursions of the voltage at point B. The voltage on capacitor 42 is forced to follow positive going variations in the voltage at point B as long as the latter voltage is two base-emitted voltage drops greater than the voltage on capacitor 42. The negative going variations in the voltage at point B are not followed unless they are slewing slower than the time constant associated with the resistor 44 and the capacitor 42. Any negative-going variations which slews faster than capacitor 42 can discharge causes the transistors 62 and 64 to be reverse biased. Therefore, there will be collector current in the transistors 62 and 64 only when capacitor 42 is charged by the voltage at point B. That collector current is applied to the transistor 66 which serves to amplify the current and apply it to a resistor 68 to create the output waveform D in FIG. 2.

Because the discharge time constant associated with resistor 44 and capacitor 42 is several fields long, the voltage on capacitor 42 roughly represents the peak value of the voltage developed on the capacitor 24. The voltage on the capacitor 42 is applied to transistors 70 and 72 which are interconnected as shown to form an emitter follower impedance buffer. The output of the buffer is a current I through a resistor 74, the current I being the feedback signal for the transistors 46 and 48.

To control the conduction of transistors 46 and 48, transistors 76 and 78 are connected as shown with the resistor 74 so that the collector current of the transistor 78 is substantially equal to the current I. Also, the base terminals of the transistors 46 and 48 are connected to the base terminal of transistor 78 to form a current mirror. That is, the collector currents of transistors 46 and 48 attempt to mirror the current I. However, the transistor 46 includes an emitter degeneration resistor 82, whereas the transistor 78 has no such resistor. Accordingly, the collector currents of transistors 46 and 48 will be smaller than the current I. However, as the current I increases, the collector currents of transistors 46 and 48 also increase, thereby increasing the rate of charge and discharge. The converse occurs when the current I decreases.

To change the charge rate/discharge rate ratio associated with the transistors 46 and 48, the emitter resistors 80 and 82 are selected to be of unequal value. The effect is as follows.

If the current I through the resistor 74 is very small, the emitter currents in transistors 46 and 48 are also very small. Consequently, the voltage drop across emitter resistors 80 and 82 is small. This causes the currents mirrored by transistors 46 and 48 to approach the value of the current I and their ratio to approach unity.

If the current I is large, there are correspondingly larger voltage drops across resistors 80 and 82 and larger currents developed by transistors 46 and 48. Because the voltage drops across resistors 80 and 82 are now larger relative to the base-emitter voltages of transistors 46 and 48, the values of resistors 80 and 82 have a greater influence on the collector currents of transistors 46 and 48. Therefore, as the current I increases, the ratio of the collector currents of transistors 46 and 48 approaches that of the ratio of resistor 80 to resistor 82.

Satisfactory performance has been obtained where the value of resistor 74 is selected to be 22 K ohms, the value of resistor 80 is selected to be 3.3 K ohms, and the value of the resistor 82 is selected to be 33 K ohms.

The embodiment described above provides a relatively easily integratable vertical sync separator which uses but a single output pin coupled to the peak detector's capacitor. The performance of the separator has been found to be satisfactory, even under sub-standard signal conditions.

It should be recognized that the sync separator may be modified to meet specific applications. For example, the emitter degeneration resistors 80 and 82 may be selected to obtain a wide range of charge and discharge rates and charge rate/discharge rate ratios. Changing the charge and discharge rates tends to hold substantially constant the voltage on the capacitor 24, and changing the charge rate/discharge rate ratio helps compensate for noise, but it also affects the amplitude of the voltage stored on the capacitor 24. Hence, a compromise between charge and discharge rates and ratios may be required for particular receivers.

Although the invention has been described in terms of a preferred structure, it will be obvious to those skilled in the art that many alterations and modifications thereto may be made without departing from the invention. All such alterations and modifications are deemed to be within the spirit and scope of the invention as defined by the appended claims.

What is claimed is:

1. In a television receiver adapted to receive a composite signal which includes horizontal and vertical sync pulses, a vertical sync separator comprising:
   a storage capacitor;
   means responsive to composite sync pulses for alternately charging and discharging said capacitor such that the capacitor develops a relatively high level voltage when vertical sync pulses are received, and responsive to a feedback signal for altering the charge and discharge rates of said capacitor;
   detector means responsive to the relatively high level voltage on the capacitor for developing a vertical sync output pulse and for producing a feedback signal indicative of the amplitude of the relatively high level voltage on the capacitor; and
   means coupling the feedback signal to the charging and discharging means for varying the charge and discharge rates so that the relatively high level voltage on the capacitor tends to remain at a substantially constant value irrespective of the signal-to-noise ratio associated with the composite signal.

2. A vertical sync separator as set forth in claim 1 wherein the amplitude of the feedback signal tends to vary from a nominal value in the presence of thermal noise in the composite signal, and wherein said charging and discharging means is responsive to the amplitude of the feedback signal for raising the charge rate/discharge rate ratio such that the capacitor discharges relatively slower in the presence of thermal noise so as to increase the sensitivity of the capacitor voltage to vertical sync pulses.

3. A vertical sync separator as set forth in claim 1 wherein the amplitude of the feedback signal tends to vary from a nominal value in the presence of impulse noise, and wherein said charging and discharging means is responsive to the amplitude of the feedback signal for lowering the charge rate/discharge rate ratio such that the capacitor discharges relatively faster so as to minimize the sensitivity of the capacitor voltage to impulse noise.

4. A vertical sync separator as set forth in claim 1 wherein said charging and discharging means includes a first current source for charging said capacitor and a second current source for discharging said capacitor.

5. A vertical sync separator as set forth in claim 4 wherein said first current source is switched alternately on and off in response to composite sync pulses and said second current source is maintained in an ON condition.

6. A vertical sync separator as set forth in claim 4 wherein said current sources are coupled in a current-mirror configuration with said capacitor.

7. In a television receiver adapted to receive a composite signal which includes horizontal and vertical sync pulses, a vertical sync separator, comprising:
   a storage capacitor;
   means responsive to composite sync pulses for alternately charging and discharging said capacitor such that the capacitor develops a relatively high level voltage when vertical sync pulses are received, and responsive to a feedback signal for altering the charge rate/discharge rate ratio of said capacitor;
   detector means responsive to the relatively high level voltage on the capacitor for developing a vertical sync output pulse and for producing a feedback signal indicative of the relatively high level voltage on the capacitor, the feedback signal tending to vary in a first direction from a nominal value when thermal noise is present in the composite signal and tending to vary in an opposite direction when impulse noise is present in the composite signal; and
   means coupling the feedback signal to said charging and discharging means so that the charge rate/discharge rate ratio is raised to discharge the capacitor relatively slower in the presence of thermal noise, and so that the charge rate/discharge rate ratio is lowered to discharge the capacitor relatively faster in the presence of impulse noise.

8. A vertical sync separator as set forth in claim 7 wherein said charging and discharging means is responsive to the feedback signal for varying the charge and discharge rates as the charge rate/discharge rate ratio is varied.

9. A vertical sync separator as set forth in claim 8 wherein said charging and discharging means includes first and second current sources coupled in a current mirror configuration with the capacitor.

10. A vertical sync separator as set forth in claim 9 wherein said first current source charges said capacitor at a first rate and said second current source discharges said capacitor at a second, different rate, and wherein changes in the amplitude of the feedback signal alter the charge and discharge rates such that a different charge rate/discharge rate ratio is effected by a change in the amplitude of the feedback signal.

11. A vertical sync separator as set forth in claim 10 wherein said detector means includes a peak detector having a second capacitor for storing thereon a voltage representing the peak value of the voltage on said storage capacitor, and including means for converting the voltage on said second capacitor to a feedback current for controlling the charge rate of said first current source and the discharge rate of said second current source.

12. A vertical sync separator as set forth in claim 11 wherein said first and second current sources each include a transistor whose level of conduction is determined by the amplitude of the feedback current and an emitter degeneration resistor, the emitter degeneration resistor associated with said first current source being smaller in value than the value of the emitter degeneration resistor associated with the second current source so that changes in the amplitude of the feedback current cause the charge rate/discharge rate ratio to change.

13. In a television receiver adapted to receive a composite signal which includes horizontal and vertical sync pulses, a vertical sync separator, comprising:
   a storage capacitor;

a charging current source and a discharging current source responsive to composite sync pulses for charging said capacitor at a relatively fast rate and for discharging said capacitor at a relatively slower rate such that the capacitor develops a relatively high level voltage when vertical sync pulses are received, and responsive to a feedback signal for simultaneously altering both the charge and discharge rates and the charge rate discharge rate ratio;

a peak detector responsive to the relatively high level voltage on the capacitor and for developing a vertical sync output pulse and for producing a feedback signal indicative of the relatively high level voltage on the capacitor; and means coupling the feedback signal to said charging and discharging current sources to vary both the charge rate/discharge rate ratio and the charge and discharge rates as a function of changes in the amplitude of the feedback signal.

14. In a television receiver adapted to receive a composite signal which includes horizontal and vertical sync pulses, a vertical sync separator, comprising:

a storage capacitor;

a current charging transistor and a current discharging transistor responsive to composite sync pulses for alternately charging and discharging said capacitor, said transistors being coupled in a current mirror configuration so as to respond to a feedback current for altering the charge and discharge rates of said capacitor;

at least another pair of transistors coupled in a current mirror configuration with their collectors coupled to opposite plates of said capacitor so as to co-operate with said charging and discharging transistors for multiplying the effective capacity of said capacitor;

a peak detector sensing the voltage developed on said capacitor so as to generate vertical sync output pulses and to generate an output voltage representative of the peak value of the voltage on said capacitor; and means for converting said output voltage to a feedback current for controlling the conduction of said charging and discharging transistors.

* * * * *